United States Patent
Tokmak et al.

(10) Patent No.: US 11,415,678 B2
(45) Date of Patent: Aug. 16, 2022

(54) RECEIVER WITH TUNABLE FILTER FOR LIGHT RANGE FINDING SYSTEM

(71) Applicant: Analog Devices International Unlimited Company, Limerick (IE)

(72) Inventors: Savas Tokmak, Istanbul (TR); Sinan Alemdar, Istanbul (TR)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 498 days.

(21) Appl. No.: 15/870,340

(22) Filed: Jan. 12, 2018

(65) Prior Publication Data

US 2019/0219674 A1 Jul. 18, 2019

(51) Int. Cl.
*G01S 7/486* (2020.01)
*G01S 7/4861* (2020.01)
*G01S 17/931* (2020.01)
*G01S 17/10* (2020.01)

(52) U.S. Cl.
CPC ............ *G01S 7/486* (2013.01); *G01S 7/4861* (2013.01); *G01S 17/10* (2013.01); *G01S 17/931* (2020.01)

(58) Field of Classification Search
None
See application file for complete search history.

(56) References Cited

U.S. PATENT DOCUMENTS

| | | |
|---|---|---|
| 3,946,328 A | 3/1976 | Boctor |
| 2002/0142733 A1* | 10/2002 | Nishinakagawa ....... H04B 1/40 455/84 |
| 2005/0089334 A1* | 4/2005 | Regev .................... H04B 10/40 398/139 |
| 2012/0268145 A1* | 10/2012 | Chandra ............... G06F 3/0416 324/686 |
| 2017/0155225 A1 | 6/2017 | Villeneuve et al. |
| 2017/0184450 A1 | 6/2017 | Doylend et al. |
| 2017/0208266 A1* | 7/2017 | Lin ........................ H04N 5/357 |

(Continued)

FOREIGN PATENT DOCUMENTS

| | | |
|---|---|---|
| CN | 101622716 A | 1/2010 |
| CN | 102460209 A | 5/2012 |

(Continued)

OTHER PUBLICATIONS

"Active Filter Design Techniques", Bruce Carter, Newnes, Fourth edition 2013 (Year: 2013).*

(Continued)

*Primary Examiner* — Yuqing Xiao
*Assistant Examiner* — Amir J Askarian
(74) *Attorney, Agent, or Firm* — Knobbe, Martens, Olson & Bear LLP

(57) ABSTRACT

A receiver for a light detection and range finding system is disclosed. The receiver can include an optoelectrical device to receive a pulse of light reflected from a target and to convert the pulse of light to a current pulse. The receiver can also include a transimpedance amplifier (TIA) to convert the current pulse to a voltage pulse. The receiver can also include a tunable filter that has an input coupled to an output of the TIA. The tunable filter can have a frequency response that is adjustable. The TIA and the tunable filter can be disposed on a single integrated circuit (IC) die.

20 Claims, 8 Drawing Sheets

(56) References Cited

U.S. PATENT DOCUMENTS

2018/0059220 A1* 3/2018 Irish .................. G01S 17/10
2018/0348345 A1* 12/2018 Haroun ............... G01S 17/26

FOREIGN PATENT DOCUMENTS

| CN | 102667521 A | 9/2012 |
|---|---|---|
| CN | 102713731 A | 10/2012 |

OTHER PUBLICATIONS

"Inductor-less Bandwidth-Extension Technique Applied to CMOS Differential Trans-impedance Amplifier" Chan (Year: 2014).*
Don'T Fear the Filter: Cascading Sallen-Keys (Year: 2017).*
High-Gain Differential Transimpedance Amplifier With DC Photodiode Current Rejection (Year: 2005).*
Passive Low Pass Filter/Second Order Filters (Year: 2017).*
Application of 3D Printing for Smart Objects with Embedded Electronic Sensors and Systems (Year: 2016).*
"Chapter 6—Active Filter Design Techniques" (Carter) (Year: 2013).*
Passive Low Pass Filter (Tutorial) (Year: 2017).*
Design, development and performance analysis of DSSS-based transceiver for VLC (Year: 2011).*
Active Low Pass Filter (Tutorial 2) (Year: 2016).*
Using Digital Potentiometers to Design Low-Pass Adjustable Filters (Baker) (Year: 2004).*
Active Low-Pass Filter Design (Karki) (Year: 2002).*
Medina et al., "Ultrasound Indoor Positioning System Based on a Low-Power Wireless Sensor Network Providing Sub-Centimeter Accuracy," Sensors, vol. 13, pp. 3501-3526, published Mar. 13, 2013.
Zach et al., "Time-of-Flight Distance Sensor with MOSFET Lowpass Filter as Key Element for Suppression of Ambient Light," Electronics Letters, vol. 46, No. 2, Jan. 21, 2010.
Zumbahlen, "Sallen-Key Filters," Analog Devices, Inc., 3 pages, Mar. 2012.
Chinese Office Action issued in application No. 201910024911.0 dated Jun. 30, 2021.
Office Action in CN Application No. 201910024911.0; dated Dec. 24, 2021.
Office Action for German Application No. 10 2018 132 915.6, dated May 24, 2022.
Chan, Cheng-Ta; Chen, Oscal T.: Inductor-less bandwidth-extension technique applied to CMOS differential trans-impedance amplifier . . . In: 2014 IEEE International Symposium on Circuits and Systems (ISCAS), 2014, 1897-1900.

* cited by examiner

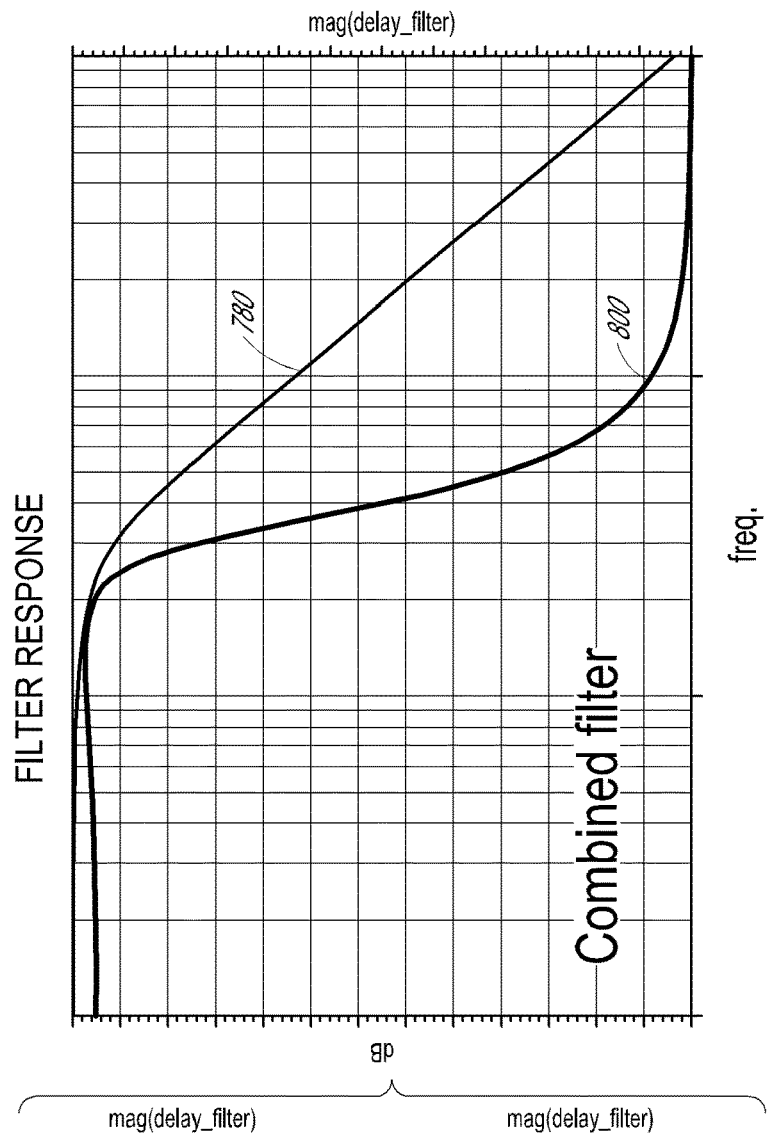
FIG. 6C
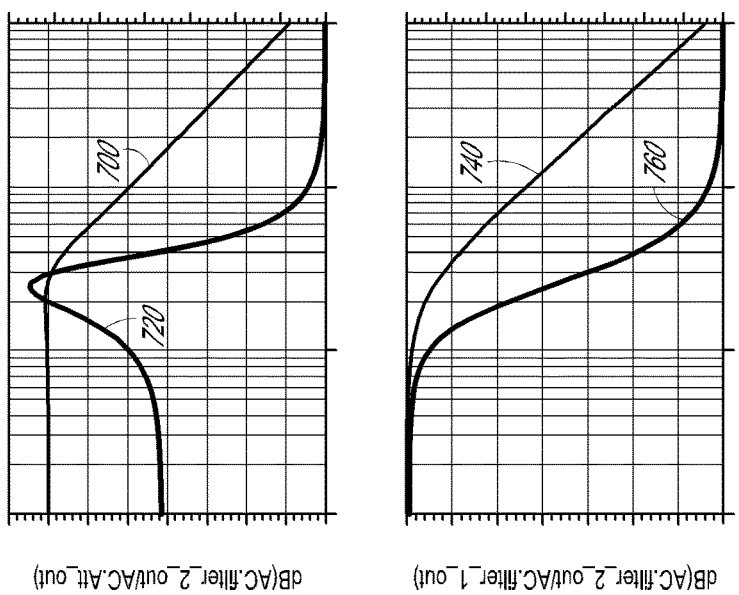
FIG. 6A
FIG. 6B

RECEIVER WITH TUNABLE FILTER FOR LIGHT RANGE FINDING SYSTEM

FIELD OF DISCLOSURE

Embodiments of this disclosure relate generally to receivers and, more particularly, to receivers for light range finding systems.

BACKGROUND

Light detection and range finding systems are used in variety of situations. For example, range finding systems can be used with air planes, automobiles, binoculars or monoculars, etc. to detect, for example, distances between the systems and objects. Overall group delay responses in the laser range finding systems can be significant in time of flight applications. There is a need for improved laser range finding systems.

SUMMARY

The innovations described in the claims each have several features, no single one of which is solely responsible for its desirable attributes. Without limiting the scope of the claims, some prominent features of this disclosure will now be briefly described.

In one aspect, a receiver for a light detection and range finding system is disclosed. The receiver includes an optoelectrical device to receive a light pulse reflected from a target and to convert the light pulse to a current pulse. The receiver further includes a transimpedance amplifier (TIA) to generate a voltage pulse from the current pulse. The receiver also includes a tunable filter that has an input coupled to an output of the TIA. The tunable filter has a frequency response that is adjustable. The TIA and the tunable filter are disposed on a single integrated circuit (IC) die.

In some embodiments, the tunable filter can comprise a tunable low pass filter. In some embodiments, the tunable filter comprises an active circuit element. In some embodiments, the optoelectrical device is disposed external to the IC die. In some embodiments, the optoelectrical device is a photodiode.

In some embodiments, the receiver further comprises an analog-to-digital converter (ADC) that has an input coupled to an output of the tunable filter. In some embodiments, the tunable filter can comprise an amplifier configured to drive the ADC.

In some embodiments, the tunable filter can comprise a resistor, a capacitor, and an amplifier. In some embodiments, the tunable filter can be configured to adjust the frequency response by at least adjusting a resistance of the resistor. In some embodiments, the tunable filter can be configured to adjust the frequency response by at least adjusting a capacitance of the capacitor.

In some embodiments, the tunable filter can comprise a first sub-filter and a second sub-filter, wherein an output of the first sub-filter is coupled to an input of the second sub-filter, and wherein at least one of the first filter or second filter is tunable.

In one aspect, a light detection and ranging (LIDAR) system is disclosed. The LIDAR system includes a light source that is configured to transmit a transmit pulse of light to a target. The LIDAR system also includes a receiver that is configured to receive light reflected from the target. The receiver comprises a tunable filter configured to filter a receive pulse that is indicative of the light reflected from the target. The receiver is configured to tune a frequency response of the tunable filter.

In some embodiments, the light source can comprise a laser. In some embodiments, the tunable filter can comprise at least one of a capacitor that has an adjustable capacitance or a resistor that has an adjustable resistance.

In some embodiments, the receiver can further comprise a transimpedance amplifier (TIA) that has an output coupled to an input of the tunable filter. In some embodiments, the tunable filter and the TIA can be disposed on a single integrated circuit (IC), and the tunable filter can comprise an active circuit element.

In one aspect, a method of tuning a frequency response of a tunable filter of a light detection and ranging (LIDAR) receiver is disclosed. The method includes adjusting an impedance of a circuit element of the tunable filter so as to cause peaking in an output pulse of the tunable filter to be reduced. The tunable filter is coupled between a transimpedance amplifier (TIA) of the LIDAR receiver and an analog-to-digital convertor (ADC) of the LIDAR receiver. A single die includes the tunable filter and the TIA. The tunable filter is configured to filter a pulse from the TIA indicative of light reflected from a target.

In some embodiments, the tunable filter can comprise an amplifier. In some embodiments, the adjusting the impedance can comprise adjusting a resistance of a resistor of the tunable filter. In some embodiments, the adjusting the impedance can comprise adjusting a capacitance of a capacitor of the tunable filter.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 6A is a graph showing group delay response and magnitude response of the first sub-filter of FIG. 5.

FIG. 6B is a graph showing group delay response and magnitude response of the second sub-filter of FIG. 5.

FIG. 6C is a graph showing a group delay response and a magnitude response of the tunable filter of FIG. 5.

DETAILED DESCRIPTION

Figure 1:
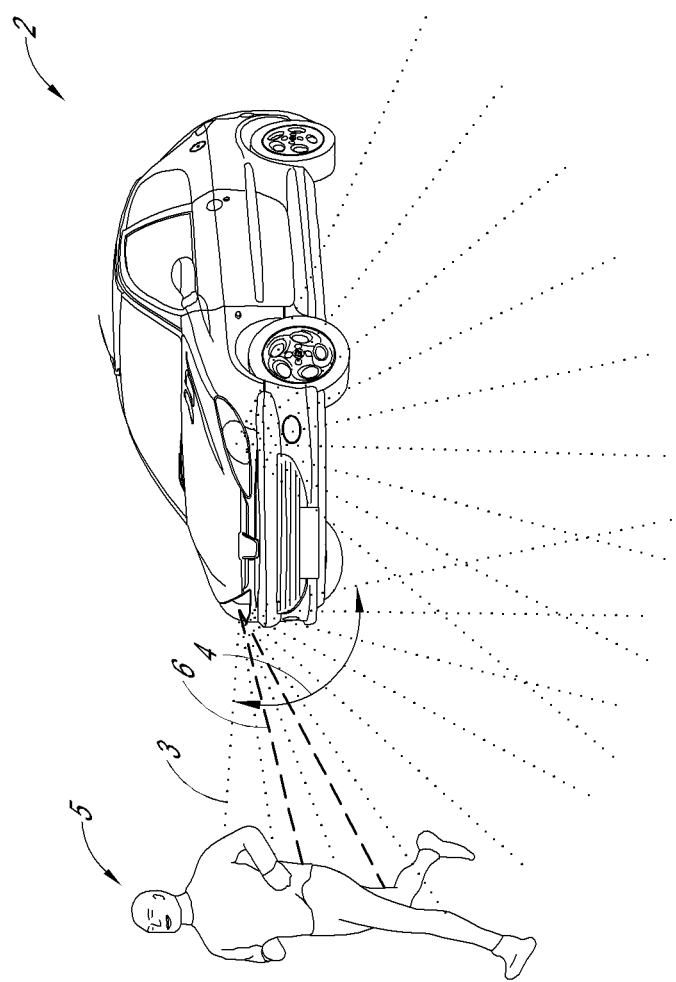
FIG. 1 is a schematic view of light detection and ranging (LIDAR) system integrated with an automobile showing an operational example.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A light range finding system can include a transmitter and a receiver. The light range finding system can be a laser range finding system. The transmitter of the system can include a digital-to-analog converter (DAC), a low pass filter (LPF), a programmable gain amplifier (PGA), a light source driver, and a light source. The receiver of the system can include a photodiode, a transimpedance amplifier (TIA), a PGA, an LPF, an analog-to-digital converter (ADC) driver, and an ADC. The transmitter can generate and transmit pulses of light to an object and the receiver can receive and analyze reflected pulses indicative of light reflected from the object. It can be undesirable to have a change (e.g., group delay distortion, etc.) in the frequency of the received pulse prior to an analog-to-digital conversion at the ADC, and a high fidelity pulse (e.g., flat group delay etc.) is typically desirable. Such a change in the frequency may cause peaking, overshoot, undershoot, etc. that can harm the quality of detection and/or estimation values.

In various LIDAR systems, a low pass filter of a receiver can cause the change in the frequency of the received pulse. The low pass filter of the receiver can be utilized with respect to a sampling speed of the ADC. Some low pass filters include discrete capacitors, resistors and/or inductors. Tolerances of such discrete components can mismatch. A low pass filter can filter noise in the pulse that is in Nyquist regions of the ADC.

Embodiments of this disclosure relate to a receiver of a laser range finding system. The receiver can include a TIA and a tunable filter (e.g., a tunable LPF). The tunable filter can be an antialiasing filter. The tunable filter can be integrated in an analog frontend receiver. The TIA and the tunable filter can be included in a single integrated circuit (IC). The tunable filter can include one or more adjustable components, such as one or more of an adjustable capacitor, an adjustable resistor, or an adjustable inductor. The receiver can also include a photodiode and an ADC.

FIG. 1 shows light detection and ranging (LIDAR) system integrated with an automobile 2. FIG. 1 illustrates two LIDAR systems integrated with the automobile 2; one near the right headlight and the other near the left headlight. For example, a transmitter of the LIDAR near the right head light can transmit pulses of light 3 at an angle 4. The light 3 can travel through the air and reach an object 5. The object 5 can reflect back receive pulses of light 6 to a receiver of the LIDAR system. The pulses of light 3 as illustrated in FIG. 1 are transmitted two dimensionally but the pulses of light 3 can be transmitted three dimensionally to obtain three dimensional information of the surroundings. More LIDAR systems can be integrated with the automobile 2 to cover a wider range of area for detection and/or to obtain additional information regarding a selected area. In some embodiments, data collected by each LIDAR system can be combined to analyze information from a wider range of area and/or to provide additional information about a selected area. In some embodiments, the angle 4 can be adjusted and the angle 4 can be in any suitable range.

Figure 2:
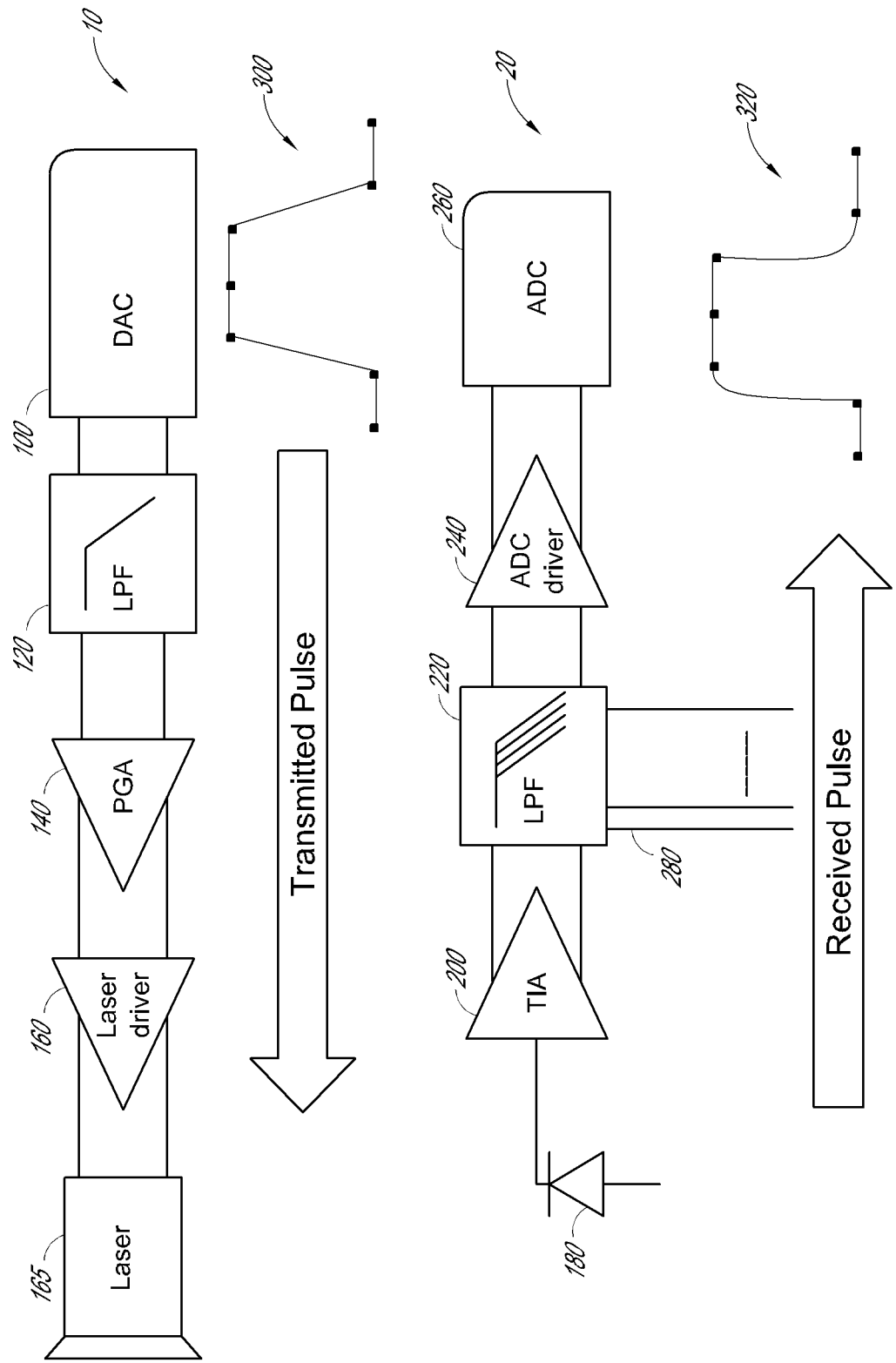
FIG. 2 is a block diagram of transmitter and receiver signal chains in a laser range finding system according to an embodiment.
Figure 3:
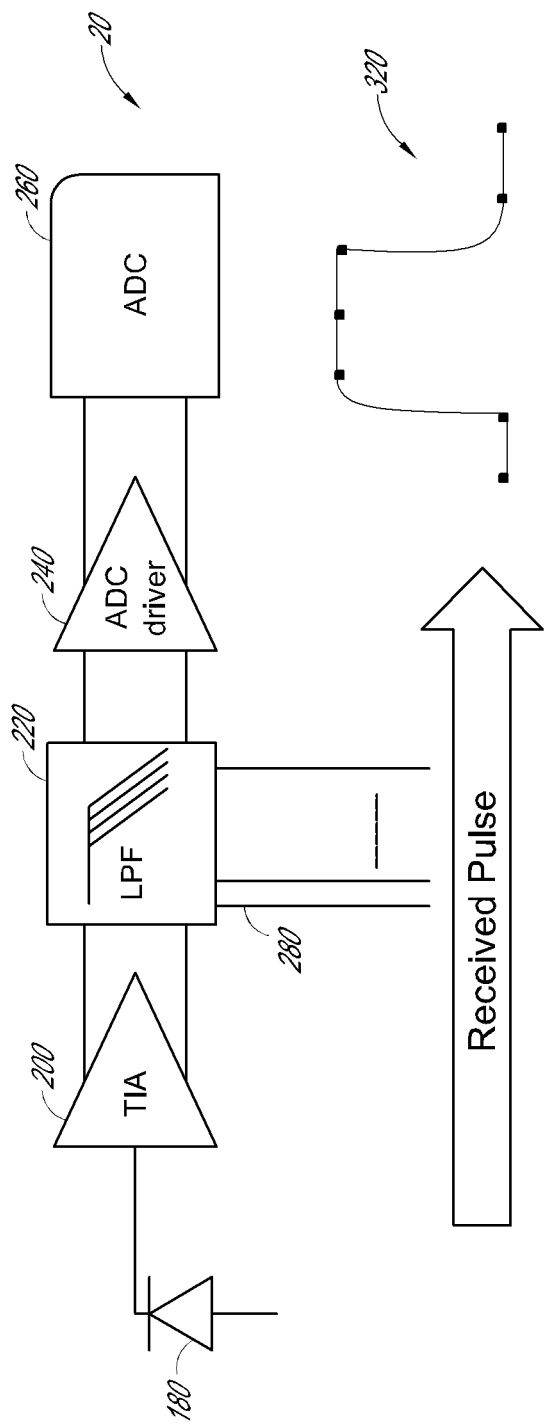
FIG. 3 is a block diagram of the receiver signal chain of a laser range finding system according to an embodiment.

FIG. 2 is a block diagram of a laser range finding system that includes a transmitter signal chain 10 and receiver signal chain 20. Some or all of the illustrated transmitter signal chain 10 and/or receiver signal chain 20 can be implemented as an application specific integrated circuit (ASIC) for a light range finding system. FIG. 3 is a block diagram of the receiver signal chain 20. FIG. 3 illustrates that a receiver can be implemented separately from a transmitter. Some or all of the illustrated receiver signal chain 20 can be implemented as an ASIC receiver for a light range finding system. The illustrated transmitter signal chain 10 includes a DAC 100, an LPF 120, a PGA 140, a laser driver 160, and a laser 165. The illustrated receiver chain 20 includes a photodiode (PD) 180, a TIA 200, a tunable filter 220, an ADC driver 240, and an ADC 260. The PD 180 is an example of an optoelectrical device. In some embodiments, the PD 180 can be replaced with any other suitable type of the optoelectrical device. In some instances, a receiver chain can include a PGA coupled between the TIA 200 and the tunable filter 220. Such a PGA could be implemented in place of or in addition to the ADC driver 240.

The transmitter chain 10 can include a laser 165 driven by the laser driver 160 to emit laser light corresponding to an original pulse 300. While FIG. 2 relates to a laser range finding system that includes the laser 165, any suitable principles and advantages discussed herein can be implemented with a light range finding system that includes any suitable light source. In some embodiments, the pulse 300 can be generated and can propagate from the DAC 100 through the LPF 120 and the PGA 140 to the laser driver 160 to drive the laser 165. The emitted light can reach an object or a target and reflected light can be received by the PD 180 of the receiver chain 20. The reflected light can be detected at the PD 180. The PD 180 can be an avalanche photodiode, for example. The PD 180 can generate a received pulse 320 based on the received reflected light and the received pulse 320 can be processed by the TIA 200 and the tunable filter 220. The ADC driver 240 can drive the ADC 260. The ADC 260 can convert the received pulse to a digital signal.

In some embodiments, the TIA 200 can have a gain that is adjustable for incoming signals. Alternatively or additionally, the TIA 200 can have an adjustable bandwidth that can be adjusted for incoming signals. Having an adjustable TIA 200 gain and/or bandwidth can be beneficial, for example, when the system is used to detect objects that are a relatively wide range of distances from the LIDAR system.

LIDAR systems include pulses, which can present different technical challenges than processing other types of signals such as sinusoids. Receive pulses in LIDAR systems can have a wider bandwidth of interest than other systems. This can present technical challenges related to, for example, group delay. Overall group delay responses of the LIDAR receiver can be significant in time of flight applications. There can be a maximum allowed group delay distortion, peaking, overshoot, and/or undershoot. Exceeding such a maximum can interfere with the detection and estimation of the LIDAR system. There are also particular tradeoffs between frequency, signal fidelity, and noise performance in LIDAR receivers. Some approaches related to filter poles being sufficiently far away from TIA bandwidth that can undesirably reduce the noise performance.

Filters in certain LIDAR systems have been left to customers and/or high end users to implement solutions for processing receive pulses. In contrast, the tunable filter 220 of the receive chain 20 provides an integrated solution in an analog front end receiver designed for processing receive pulses with relatively high signal fidelity. The integrated tunable filter 220 can provide enhanced noise performance relative to certain externally implemented filters.

The tunable filter 220 can be an antialiasing low pass filter. The tunable filter 220 can reduce and/or eliminate aliasing and additional noise from other Nyquist regions of the ADC 240. The tunable filter 220 can filter out overshoots and/or undershoots in output of the TIA 200. The receiver chain 20 can maintain signal integrity by implementing a relatively flat group delay response at the frequency of interest. This can protect the time of flight information in pulsed systems. The tunable filter 220 can enable such a desirable group delay response.

Figure 8:
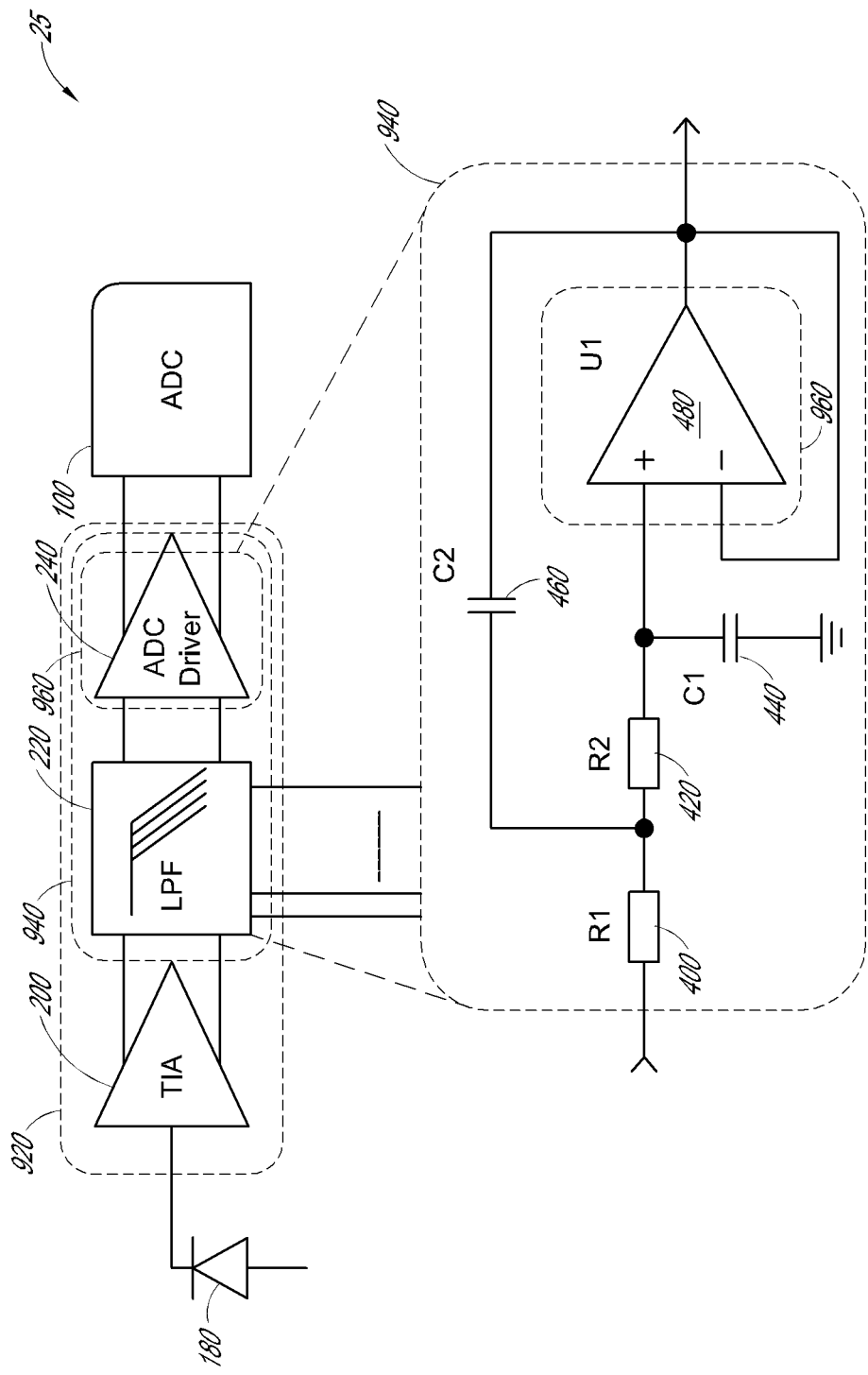
FIG. 8 is a block diagram of a receiver chain having a tunable filter that also serves as a driver for an analog-to-digital converter according to an embodiment.

The tunable filter 220 can comprise any filter suitable for filtering the incoming signals. For example, the tunable filter 220 can comprise a tunable low pass filter, a tunable high pass filter, a tunable bandpass filter, etc. In some embodiments, the tunable filter 220 comprises a capacitor, a resistor, and an amplifier. In some embodiments, the components of the tunable filter 220 can be adjusted via control signals provided by electrical connections 280. One or more circuit elements of the tunable filter 220 can be adjusted to adjust the frequency response, for example, cutoff frequency, quality factor, etc. This, in turn, can reduce and/or eliminate one or more undesirable features of a frequency response of the filter, such as, peaking, overshoot, undershoot, the like, or any combination thereof. In some embodiments, the tunable filter 220 can facilitate recovering overall receiver group delay distortions that are caused by other components, such as the TIA 200 and/or the ADC driver 240 in the receiver chain 20. In some embodiments, an amplifier in the tunable filter 220 can implement the illustrated ADC driver 240, for example, as shown in FIG. 8.

Figure 7A:
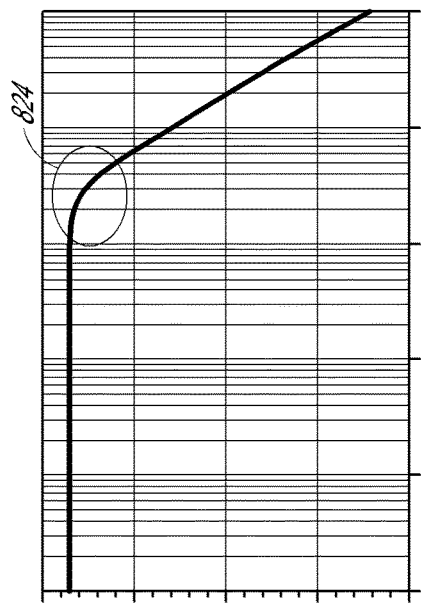
FIG. 7A is a graph showing a frequency domain response measured at an output of a transimpedance amplifier (TIA) of FIG. 2.
Figure 7B:
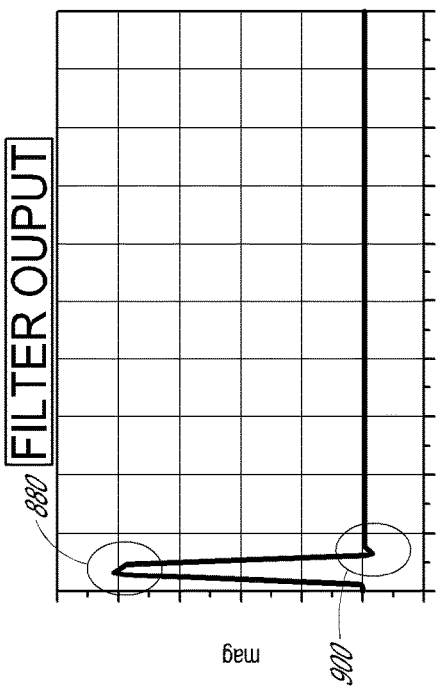
FIG. 7B is a graph showing a frequency domain response measured at the filter output of the tunable filter of FIG. 2.
Figure 7C:
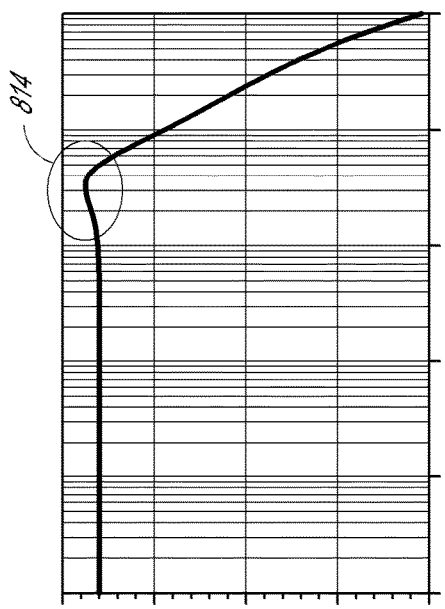
FIG. 7C is a graph showing a time domain response measured at the output of the TIA of FIG. 2.
Figure 7D:
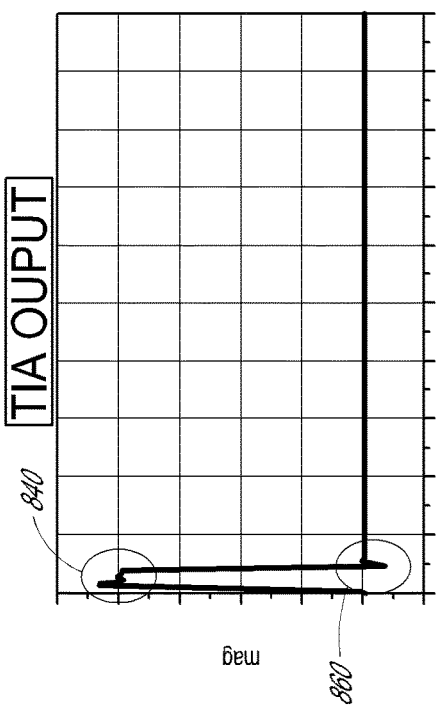
FIG. 7D is a graph showing a time domain response measured at the filter output of the tunable filter of FIG. 2.

The tunable filter 220 can be adapted to filter signals associated with a larger set of photodiodes that can be implemented with the TIA 200 than fixed filters while maintaining a high fidelity receive pulse. For example, in some instances, the TIA 200 can be arranged to process an output of the PD 180 having a capacitance of about 1 picofarad (pF) to 2 pF. Such a TIA 200 may not be able to maintain signal integrity of a pulse from a photodiode having a capacitance of about 0.5 pF. For instance, peaking (e.g., as shown in FIGS. 7A and 7C) can be present in the output of the TIA 200 for such a photodiode. The frequency response of the tunable filter 220 can be adjusted for a particular photodiode to remove peaking (e.g., as shown in FIGS. 7B and 7D) such that the same tunable filter 220 can be used in a combination with a variety of photodiodes and still maintain fidelity of a receive pulse. With the tunable filter 220, the receive chain 20 can provide a receive pulse with relatively high signal integrity for a wider range of photodiode capacitance values relative to fixed filters. In instances in which the TIA 200 and the tunable filter 220 are on the same semiconductor die, the semiconductor die can be implemented with a variety of different photodiodes.

As illustrated in FIGS. 2 and 3, a TIA output of the TIA 200 is coupled to a filter input of the tunable filter 220 and a filter output of the tunable filter 220 is coupled a driver input of the ADC driver 240. In some other embodiments, an ADC driver can be coupled between a TIA and a tunable filter in a receiver chain.

The TIA 200 and the tunable filter 220 can be embodied on a single integrated circuit (IC) die. In some instances, the TIA 200, the tunable filter 220, and the ADC driver 240 can be embodied on the single IC die. Implementing the tunable filter 220 on the same semiconductor die as other circuit elements of the receive chain can result in a compact design and/or can be relatively inexpensive to implement. The semiconductor die can be a silicon die, for example. In some embodiments, the single IC die can also include the PD 180. According to certain embodiments, the PD 180 is external to an IC die that includes the TIA 200 and the tunable filter 220.

Figure 4:
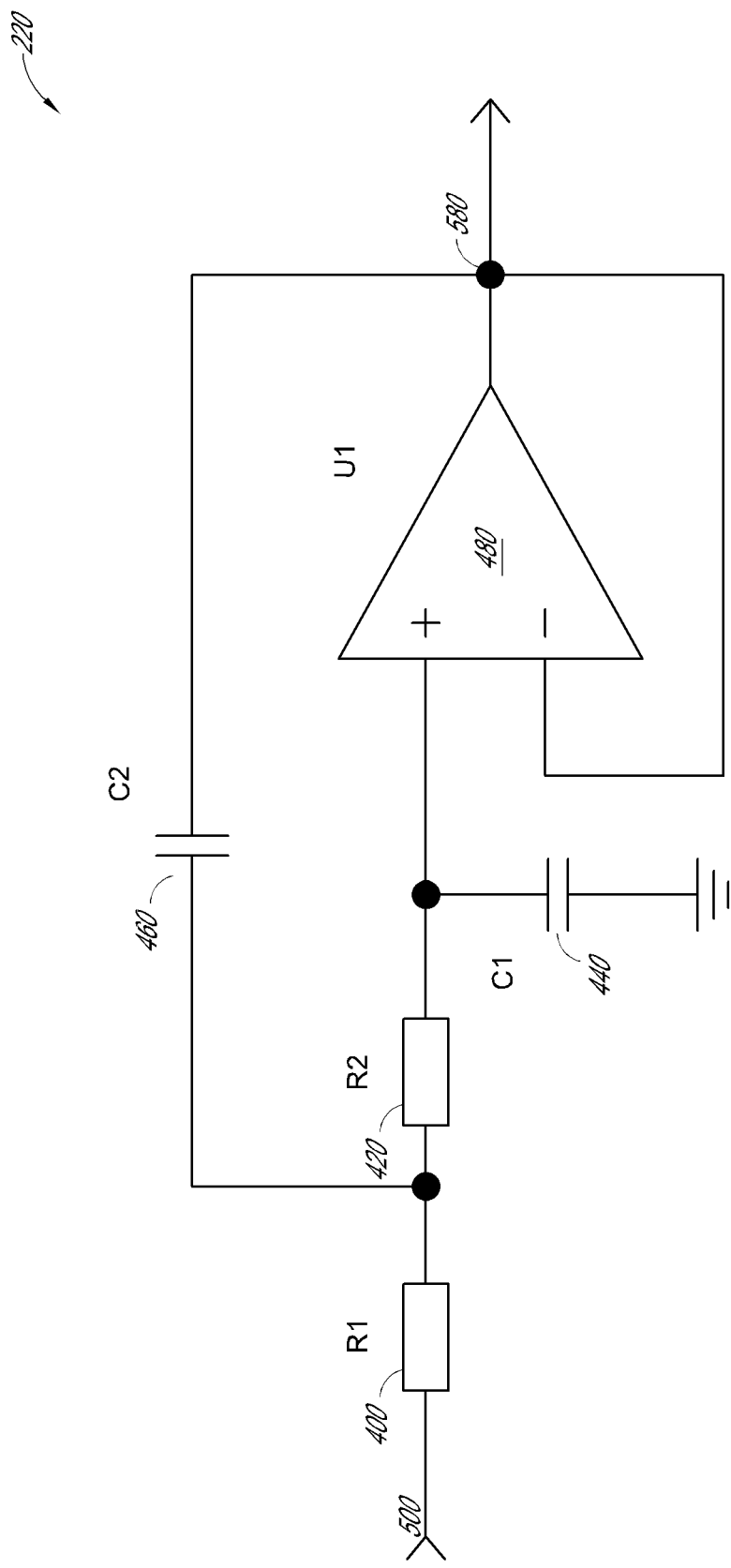
FIG. 4 is a schematic diagram of a filter topology of a tunable filter of a receiver of a LIDAR system according to an embodiment.

FIG. 4 is a schematic diagram of an example filter topology of the tunable filter 220. The filter topology illustrated in FIG. 4 includes first and second resistors 400 and 420 having first and second resistances R1 and R2, respectively, first and second capacitors 440 and 460 having first and second capacitances C1 and C2, respectively, and an amplifier 480. The amplifier 480 can be an operational amplifier. The amplifier 480 includes transistors. Accordingly, the tunable filter 220 illustrated in FIG. 4 includes active circuit elements. The tunable filter 220 can receive a pulse at a filter input 500. The filter input 500 can be coupled to an output of a TIA. The tunable filter 220 can filter a pulse output from the TIA and output a filtered pulse at filter output 580.

The tunable filter 220 can be configured to adjust its frequency response by adjusting an impedance of one or more passive impedance elements, such as one or more of the illustrated resistors and/or one or more of the illustrated capacitors. For instance, the resistance R1 and/or the resistance R2 can be adjusted. Alternatively or additionally, capacitance C1 and/or C2 can be adjusted. For the filter topology illustrated in FIG. 4, the relationship between the cutoff frequency $\omega_0$ of the tunable filter 220 and the resistances R1, R2 and the capacitances C1, C2 can be represented by Equation 1:

$$\omega_0 = 2\pi f_0 = \frac{1}{\sqrt{R1R2C1C2}} \qquad \text{(Equation 1)}$$

The relationship between the quality factor $Q$ of the tunable filter 220 and the resistances R1, R2 and the capacitances C1, C2 can be represented by Equation 2:

$$Q = \frac{\omega_0}{2\alpha} = \frac{\sqrt{R1R2C1C2}}{C2(R1+R2)} \qquad \text{(Equation 2)}$$

In Equation 2, $\alpha$ represents an attenuation rate. Therefore, any one of the resistances R1, R2 and the capacitances C1, C2 can affect the values of the cutoff frequency and the quality factor of the tunable filter 220.

The resistance of the resistor 400 and/or the resistor 420 can be adjusted in any suitable way. As one example, the resistor 400 can be implemented by an array of resistors that can be selectively switched in to contribute to the resistance R1 of the resistor 400 and switched out to be excluded from the resistance R2 of the resistor 400.

The capacitance C1, C2 of the capacitor 440 and/or the capacitor 460 can be adjusted in any suitable way. As an example, the capacitor 440 can be implemented by an array of capacitors in parallel with each other in which one or more capacitors of the array can be selectively switched in to contribute to the capacitance C1 of the capacitor 440 and switched out to be excluded from the capacitance C1 of the capacitor 440.

Figure 5:
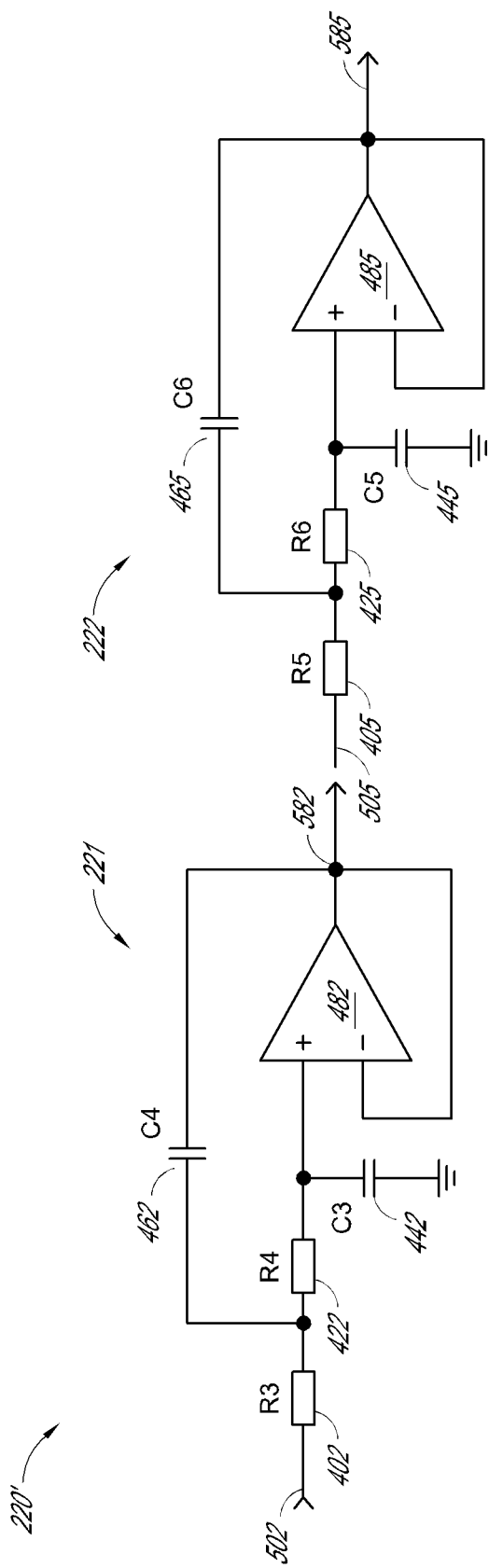
FIG. 5 is a schematic diagram of another filter topology of a tunable filter comprising a first sub-filter and a second sub-filter according to an embodiment.

FIG. 5 shows a schematic diagram of another filter topology of the tunable filter 220'. The filter topology of the tunable filter 220' illustrated in FIG. 5 includes first and second sub-filters 221 and 222, respectively. The sub-filters 221 and 222 are cascaded with each other as illustrated in FIG. 5.

The first sub-filter 221 can comprise the same filter topology that is illustrated in FIG. 4. As illustrated, the first sub-filter 221 includes third and fourth resistors 402 and 422 having first and second resistances R3 and R4, respectively, third and fourth capacitors 442 and 462 having third and fourth capacitances C3 and C4, respectively, and an amplifier 482. The second sub-filter 222 can comprise the same filter topology that is illustrated in FIG. 4. As illustrated, the second sub-filter 222 includes fifth and sixth resistors 405 and 425 having fifth and sixth resistances R5 and R6, respectively, fifth and sixth capacitors 445 and 465 having fifth and sixth capacitances C5 and C6, respectively, and an amplifier 485.

The first sub-filter 221 and/or the second sub-filter 222 of the tunable filter 220' can be tunable. In some embodiments, only one of the sub-filters 221, 222 of the tunable filter 220' can be tunable. According to some other embodiments both of the sub-filters 221, 222 are tunable. As illustrated in FIG. 5, the filter output 582 of the first sub-filter 221 can be coupled to a filter input 505 of the second sub-filter. Any suitable number of sub-filters can be cascaded with each other to implement a tunable filter.

FIGS. 6A and 6B are graphs showing magnitude responses 700 and 740 and group delay responses 720 and 760 of the first and second sub-filters 221 and 222, respectively, shown in FIG. 5 measured individually. FIG. 6C is a graph showing a group magnitude response 780 and a delay response 800 of the tunable filter 220' of FIG. 5 that comprises the first and second sub-filters 221, 222. With the filter topology shown in FIG. 4, it can be difficult to tune the filter to achieve a desired group delay and sharp cutoff in the frequency response of the filter. Accordingly, two or more sub-filters can be cascaded with each other, as illustrated, for example, in FIG. 5, to implement a filter with a desired frequency response in which the sub-filters can be individually tuned to achieve the desired frequency response in the combined filter. Such cascaded sub-filters can implement a higher order filter than the filter topology illustrated in FIG. 4.

For a receiver chain with a TIA having 20 MHz of bandwidth, a 4th order Bessel filter can be implemented in ~50 MHz for optimum group delay. This can cause an increased integrated noise. With a tunable filter that includes sub-filters, more sophisticated approaches can be implemented for sharp filtering (e.g., filter poles are at about 25 MHz) such as using filters having opposite group delay slopes. This can implement a sharp filtering with a desirable group delay response.

The first sub-filter 221 can cause more group delay changes than desired (e.g., peaking) but has a relatively sharp cutoff. FIG. 6A shows an example of such a frequency response. The second sub-filter 222 can have a relatively flat response at an operating region (e.g., 20 MHz to 50 MHz) but a less sharp cutoff than desired. FIG. 6B shows an example of such a frequency response. When the sub-filters 221, 222 are cascaded with each other as shown in FIG. 5, the tunable filter 220 can have a combined frequency response that has a relatively sharp cutoff and a relatively flat response over an operating region as shown in FIG. 6C.

Tunable low pass filters discussed herein can fix overshoots and/or undershoots caused by a TIA in the LIDAR receiver chain. A peaking in a combined frequency response of a phase detector and TIA can cause overshoots and/or undershoots. A cutoff frequency and/or other parameter of the frequency response of the tunable filters discussed herein can reduce and/or eliminate overshoots and/or undershoots present at an output of the TIA of a LIDAR receiver.

FIGS. 7A and 7B are graphs showing frequency domain responses measured at the TIA output of the TIA and the filter output of the tunable filter, respectively. An overshoot in a frequency response at the TIA output is shown by a peak 814 in FIG. 7A. A tunable filter can filter out such a peak. As shown in FIG. 7B, the peak 814 is filtered out in the frequency response at the filter output. In the frequency response shown in FIG. 7A, at a first frequency to a second frequency, the magnitude of the frequency response at the TIA output and the filter output is substantially constant. As an example, the first frequency can be 10 kHz and the second frequency can be 10 MHz. Starting at around the second frequency, the frequency response at the TIA output increases to a peak value at around a third frequency, and then the frequency response starts to decrease at higher frequencies. The third frequency can be, for example, 35 MHz when the second frequency is 10 MHz and the first frequency is 10 kHz. The frequency response at the filter output shows that a tunable filter can smooth the peaking in the frequency response of the TIA output.

FIGS. 7C and 7D are graphs showing time domain responses measured at the TIA output of the TIA and the filter output of the tunable filter, respectively. As shown in FIG. 7C, the frequency response at the TIA output has overshoots at regions 840, 860. A tunable filter in accordance with the principles and advantages discussed herein can reduce and/or eliminate such peaking as shown by corresponding regions 880, 900 of FIG. 7D.

A flat group delay can be desirable for pulsed high speed applications to preserve pulse shapes in such applications. In order to have a flat group delay response, Bessel type filters can be used. A Bessel filter's pass band insertion loss is typically less than 3 dB, but it can still have a substantial loss and could be sufficient to reduce the TIA 3 dB bandwidth when cascaded with another filter. For example, assuming that the TIA has 3 dB bandwidth of a TIA frequency ($f_{TIA}$) and the Bessel filter has 3 dB bandwidth of a filter frequency ($f_{Filter}$), a typical rule of thumb is to provide Bessel filter poles sufficiently far from $f_{TIA}$, such as at least about 1.5 times the $f_{TIA}$. With a multiple order filter approach, less insertion loss in the pass band with sharper out of band attenuations can be achieved while preserving group delay flatness as compared to a single Bessel filter approach. Thus, the $f_{Filter}$ can be placed closer to the $f_{TIA}$ than with the Bessel filter, which allows for better out-of-band filtering.

The tunable filter 220 can be tunable across the $f_{Filter}$ to one fourth the $f_{Filter}$, or two octaves. During this tunability, overall group delay flatness can be maintained such that the overall group delay flatness does not significantly change. While the TIA bandwidth stays approximately the same, the tunable filter 220 can determine the overall system bandwidth. The filter tunability allows for reducing the bandwidth, achieving desirable pulse properties, improving signal to noise ratio (SNR), or any suitable combination thereof.

FIG. 8 is a block diagram of a receiver chain 25 in some embodiments. FIG. 8 illustrates that, in some embodiments, a tunable filter 940 can include an amplifier 480 that can implement a gain stage 960 of an ADC driver 240. Accordingly, the tunable filter 220 can implement the ADC driver 240. As such, a separate ADC driver can be omitted and a tunable filter 940 can function as both a tunable filter and an ADC driver. In some embodiments, the TIA 200 and the tunable filter 940 can be embodied on the same die. The die can be an application specific integrated circuit (ASIC) receiver 920. In some embodiments, the ASIC receiver 920 can include the PD 180 and/or the ADC 100. The receiver chain illustrated in FIG. 8 is a power and physical area efficient approach to implement an active filter using a gain stage of the ADC driver 240. The approach of FIG. 8 can take advantage of an intrinsic bandwidth limitation of the ADC driver 240 in filtering the output signal provided by the TIA 200. The embodiment of FIG. 8 can be beneficial because it can reduce overall size of the receiver relative to having separate amplifiers for the tunable filter 220 and the ADC driver 240. Also, in some embodiments, active elements' poles of the ADC driver 240 can be combined with passive filter poles to provide extra filtering.

Any of the principles and advantages discussed herein can be applied to other systems, devices, integrated circuits, electronic apparatus, methods, not just to the embodiments described above. The elements and operations of the various embodiments described above can be combined to provide further embodiments. The principles and advantages of the embodiments can be used in connection with any other systems, devices, integrated circuits, apparatus, or methods that could benefit from any of the teachings herein.

Aspects of this disclosure can be implemented in various range finding systems. For instance, aspects of this disclosure can be implemented in any LIDAR systems such as, for example, automobile LIDAR, industrial LIDAR, military LIDAR, etc. Moreover, aspects of this disclosure can be implemented in various electronic devices. Examples of the electronic devices can include, but are not limited to, electronic products, parts of electronic products such as integrated circuits, vehicular electronics such as automotive electronics, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," and words of similar import, when used in this application, shall refer to this application as a whole and not to any particular portions of this application. Where the context permits, words in the above Detailed Description using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

For purposes of summarizing the disclosed embodiments and the advantages achieved over the prior art, certain objects and advantages have been described herein. Of course, it is to be understood that not necessarily all such objects or advantages may be achieved in accordance with any particular embodiment. Thus, for example, those skilled in the art will recognize that the disclosed implementations may be embodied or carried out in a manner that achieves or optimizes one advantage or group of advantages as taught or suggested herein without necessarily achieving other objects or advantages as may be taught or suggested herein.

All of these embodiments are intended to be within the scope of this disclosure. These and other embodiments will become readily apparent to those skilled in the art from the following detailed description of the embodiments having reference to the attached figures, the claims not being limited to any particular embodiment(s) disclosed. Although this certain embodiments and examples have been disclosed herein, it will be understood by those skilled in the art that the disclosed implementations extend beyond the specifically disclosed embodiments to other alternative embodiments and/or uses and obvious modifications and equivalents thereof. In addition, while several variations have been shown and described in detail, other modifications will be readily apparent to those of skill in the art based upon this disclosure. It is also contemplated that various combinations or sub-combinations of the specific features and aspects of the embodiments may be made and still fall within the scope. It should be understood that various features and aspects of the disclosed embodiments can be combined with, or substituted for, one another in order to form varying modes of the disclosed implementations. For example, circuit blocks described herein may be deleted, moved, added, subdivided, combined, and/or modified. Each of these circuit blocks may be implemented in a variety of different ways. Thus, it is intended that the scope of the subject matter herein disclosed should not be limited by the particular disclosed embodiments described above, but should be determined by a fair reading of the claims that follow.

What is claimed is:

1. A receiver for a light detection and range finding system, the receiver comprising:
   an optoelectrical device configured to receive a pulse of light reflected from a target and to convert the pulse of light to a current pulse;
   a transimpedance amplifier (TIA) configured to generate a voltage pulse from the current pulse; and a tunable low pass filter having an input coupled to an output of the TIA, the tunable low pass filter comprising an active circuit element and passive impedance elements, the tunable low pass filter configured to adjust a frequency response by adjusting an impedance of one or more of the passive impedance elements, the tunable low pass filter configured to protect time of flight information in the voltage pulse from the TIA by implementing a group delay response, the tunable low pass filter configured to filter out an overshoot and/or an undershoot in the voltage pulse generated by the TIA, wherein the overshoot and/or the undershoot is caused by a combined frequency response of the optoelectrical device and the TIA, wherein the TIA and the tunable low pass filter are disposed on a single integrated circuit (IC) die, and wherein the tunable low pass filter comprises a plurality of sub-filters that are cascaded with each other.

2. The receiver of claim 1, wherein the optoelectrical device is external to the IC die.

3. The receiver of claim 1, wherein the optoelectrical device is a photodiode.

4. The receiver of claim 1, further comprising an analog-to-digital converter (ADC) having an input coupled to an output of the tunable low pass filter.

5. The receiver of claim 4, wherein the tunable low pass filter comprises an amplifier configured to drive the ADC.

6. The receiver of claim 1, wherein the one or more passive impedance elements comprise a resistor and a capacitor, and wherein the active circuit element comprises an amplifier.

7. The receiver of claim 6, wherein the impedance comprises a resistance of the resistor.

8. The receiver of claim 6, wherein the impedance comprises a capacitance of the capacitor.

9. The receiver of claim 1, wherein the plurality of sub-filters comprise a first sub-filter and a second sub-filter, wherein an output of the first sub-filter is coupled to an input of the second sub-filter, and wherein at least one of the first sub-filter or second sub-filter is tunable.

10. The receiver of claim 1, wherein the TIA has at least one of an adjustable gain or an adjustable bandwidth.

11. A light detection and ranging (LIDAR) system comprising:

a light source configured to transmit a transmit pulse of light to a target; and a receiver configured to receive light reflected from the target, the receiver comprising:

a transimpedance amplifier (TIA) configured to generate a voltage pulse; and a tunable filter having an input coupled to an output of the TIA, the tunable filter comprising an active circuit element and passive impedance elements, the tunable filter configured to filter out an overshoot and/or an undershoot in the voltage pulse generated by the TIA, the voltage pulse indicative of the light reflected from the target, the overshoot and/or the undershoot caused by a combined frequency response of the optoelectrical device and the TIA, and the tunable filter configured to protect time of flight information in the voltage pulse from the TIA by implementing a group delay response, wherein the receiver is configured to tune a frequency response of the tunable filter by at least adjusting an impedance of one or more of the passive impedance elements of the tunable filter.

12. The LIDAR system of claim 11, wherein the light source comprises a laser.

13. The LIDAR system of claim 11, wherein the tunable filter and the TIA are included on a single integrated circuit.

14. The LIDAR system of claim 13, wherein the tunable filter comprises a plurality of sub-filters that are cascaded with each other.

15. The LIDAR system of claim 11, wherein the tunable filter comprises at least one of a capacitor that has an adjustable capacitance or a resistor that has an adjustable resistance.

16. The LIDAR system of claim 11, wherein the tunable filter comprises a tunable low pass filter, and the tunable filter includes an amplifier configured to drive an analog-to-digital convertor (ADC) coupled to an output of the tunable filter.

17. A method of tuning a frequency response of a tunable filter of a light detection and ranging (LIDAR) receiver, the method comprising:

adjusting an impedance of one or more passive impedance elements of the tunable filter so as to cause peaking in an output pulse of the tunable filter to be reduced, the tunable filter comprising an active circuit element and the one or more passive impedance elements;

wherein the tunable filter is coupled between a transimpedance amplifier (TIA) of the LIDAR receiver and an analog-to-digital convertor (ADC) of the LIDAR receiver, wherein a single die includes the tunable filter and the TIA, wherein the tunable filter is configured to implement a group delay response to protect time of flight information in a pulse from the TIA, and wherein the tunable filter is configured to filter out an overshoot and/or an undershoot in the pulse from the TIA after said adjusting.

18. The method of claim 17, wherein the active circuit element comprises an amplifier.

19. The method of claim 17, wherein the adjusting the impedance comprises adjusting a resistance of a resistor of the tunable filter.

20. The method of claim 17, wherein the adjusting the impedance comprises adjusting a capacitance of a capacitor of the tunable filter.

* * * * *